(12) United States Patent
Connors et al.

(10) Patent No.: US 9,797,023 B2
(45) Date of Patent: Oct. 24, 2017

(54) SHAFT FURNACE AND METHOD OF OPERATING SAME

(71) Applicant: Grede LLC, Southfield, MI (US)

(72) Inventors: Bill Connors, Reedsburg, WI (US); Kipp Witters, Reedsburg, WI (US)

(73) Assignee: GREDE LLC, Southfield, MI (US)

( * ) Notice: Subject to any disclaimer, the term of this patent is extended or adjusted under 35 U.S.C. 154(b) by 244 days.

(21) Appl. No.: 14/282,585

(22) Filed: May 20, 2014

(65) Prior Publication Data

US 2015/0176095 A1    Jun. 25, 2015

Related U.S. Application Data

(60) Provisional application No. 61/919,077, filed on Dec. 20, 2013.

(51) Int. Cl.

| | |
|---|---|
| *C21B 11/02* | (2006.01) |
| *C21B 5/00* | (2006.01) |
| *C21B 7/16* | (2006.01) |
| *F27B 1/16* | (2006.01) |
| *F27B 1/28* | (2006.01) |
| *C21B 13/02* | (2006.01) |

(52) U.S. Cl.
CPC .............. *C21B 5/001* (2013.01); *C21B 5/006* (2013.01); *C21B 7/16* (2013.01); *C21B 11/02* (2013.01); *C21B 13/023* (2013.01); *F27B 1/16* (2013.01); *F27B 1/28* (2013.01); *C21B 2005/005* (2013.01); *Y02P 10/143* (2015.11)

(58) Field of Classification Search
CPC ....... C21B 11/02; C21B 13/023; C21B 5/001; C21B 2005/005

USPC .......................................................... 266/197
See application file for complete search history.

(56) References Cited

U.S. PATENT DOCUMENTS

| | | |
|---|---|---|
| 2,235,939 A | 3/1941 | Maag |
| 2,495,264 A | 1/1950 | Kreulen |
| 3,157,492 A | 11/1964 | Matuschkovitz |

(Continued)

FOREIGN PATENT DOCUMENTS

WO    2008080922    7/2008

OTHER PUBLICATIONS

Written Opinion for International Patent Application No. PCT/US14/71357, mailed Mar. 12, 2015.

(Continued)

*Primary Examiner* — Scott Kastler
(74) *Attorney, Agent, or Firm* — McDonald Hopkins LLC (57) ABSTRACT

A method of operating a shaft furnace includes inserting a mixture including anthracite coal and coke into a cavity defined by the furnace, and disposing a metal feedstock within the cavity. The method includes injecting natural gas at a natural gas flow rate and a first quantity of oxygen gas at a first oxygen gas flow rate into the cavity simultaneously through at least one burner. The method also includes driving a second quantity of oxygen gas at a supersonic oxygen gas flow rate into the cavity through at least one lance, wherein the supersonic oxygen gas flow rate is greater than the first oxygen gas flow rate. The method also includes combusting the mixture within the cavity to produce a stack gas, melting the metal feedstock to produce a melted metal material, and monitoring the stack gas to thereby operate the shaft furnace. A shaft furnace is also disclosed.

24 Claims, 3 Drawing Sheets

(56) References Cited

U.S. PATENT DOCUMENTS

| | | | |
|---|---|---|---|
| 3,601,381 | A | 8/1971 | Beggs |
| 4,324,583 | A | 4/1982 | Hamilton |
| 4,504,043 | A | 3/1985 | Yamaoka et al. |
| 8,317,897 | B2 | 11/2012 | Beaudoin |
| 2002/0005089 | A1 | 1/2002 | Nagata et al. |
| 2003/0090044 | A1 | 5/2003 | Li |
| 2005/0151307 | A1 | 7/2005 | Viramontes-Brown et al. |
| 2008/0237944 | A1 | 10/2008 | Konig et al. |
| 2010/0186552 | A1 | 7/2010 | Niehoff et al. |
| 2011/0154949 | A1 | 6/2011 | Rheker |
| 2012/0090515 | A1 | 4/2012 | Didelon et al. |
| 2015/0176095 | A1* | 6/2015 | Connors ............... C21B 11/02 266/47 |

OTHER PUBLICATIONS

International Search Report for International Patent Application No. PCT/US14/71357, mailed Mar. 12, 2015.
Brian H. Bowen, Marty W. Irwin; "Coal Characteristics CCTR Basic Facts File #8"; Indiana Center for Coal Technology Research; Oct. 2008; Purdue University, West Lafayette, Indiana.
T. Niehoff, H. Struning, O. Frielingsdorf, M. Wilczek, T. Wieting, J. Schafer, M. Lemperle; "Oxy-Fuel Burner Technology for Cupola Metling"; 2nd International Cupola Conference, Lecture No. 2-4;Trier 18./19.03.2004.
"APCOS Air Products Cupola Oxy-Fuel System"; http://www.airproducts.com/canada/french/metals/pdf/APCOS-152KB.pdf, accessed on Dec. 2, 2013.
"Environmental Innovation"; https://www.wmc.org/cms/wp-content/uploads/2013/05/BFOE-Profiles_2013_Grede.pdf, published on Mar. 28, 2013; accessed on Dec. 2, 2013.

* cited by examiner

SHAFT FURNACE AND METHOD OF OPERATING SAME

CROSS-REFERENCE TO RELATED APPLICATIONS

This application claims the benefit of U.S. Provisional Patent Application No. 61/919,077, filed Dec. 20, 2013, which is hereby incorporated by reference in its entirety.

TECHNICAL FIELD

The disclosure relates to shaft furnaces and methods of operating shaft furnaces.

BACKGROUND

Shaft furnaces, such as cupola furnaces, may be used to melt a metal feedstock via combustion to produce a melted metal material. For example, pig iron may be melted within a cupola furnace to produce cast iron. During certain furnace operating conditions, such combustion may produce a stack gas including, for example, carbon monoxide gas.

SUMMARY

A method of operating a shaft furnace includes inserting a mixture including anthracite coal and coke into a cavity defined by the shaft furnace, and disposing a metal feedstock within the cavity. The method also includes injecting natural gas at a natural gas flow rate and a first quantity of oxygen gas at a first oxygen gas flow rate into the cavity simultaneously through at least one burner. In addition, the method includes driving a second quantity of oxygen gas at a supersonic oxygen gas flow rate into the cavity through at least one lance, wherein the supersonic oxygen gas flow rate is greater than the first oxygen gas flow rate. The method further includes combusting the mixture within the cavity to produce a stack gas, melting the metal feedstock to produce a melted metal material, and monitoring the stack gas to thereby operate the shaft furnace.

A shaft furnace includes a shell defining a cavity therein, and a charge disposed within the cavity. The charge includes a metal feedstock, a flux material, and a mixture including anthracite coal and coke. The shaft furnace also includes a windbox configured for collecting a blast air, and a plurality of tuyeres each extending through the shell and configured for introducing the blast air into the cavity at a blast air flow rate. In addition, the shaft furnace includes at least one burner disposed within a first one of the plurality of tuyeres. The at least one burner is configured for simultaneously injecting a first quantity of oxygen gas into the cavity at a first oxygen gas flow rate and natural gas into the cavity at a natural gas flow rate. The shaft furnace also includes at least one lance disposed within a second one of the plurality of tuyeres. The at least one lance is configured for driving a second quantity of oxygen gas into the cavity at a supersonic oxygen gas flow rate that is greater than the first oxygen gas flow rate. Further, the shaft furnace includes a stack gas including a plurality of combustion products, and a stack gas analyzer apparatus configured for measuring an amount of the plurality of combustion products present in the stack gas. The shaft furnace also includes a melted metal material removable from the cavity.

As used herein, the terms "a," "an," "the," "at least one," and "one or more" are interchangeable and indicate that at least one of an item is present. A plurality of such items may be present unless the context clearly indicates otherwise. All numerical values of parameters, quantities, or conditions in this disclosure, including the appended claims, are to be understood as being modified in all instances by the term "about" or "approximately" whether or not "about" or "approximately" actually appears before the numerical value. "About" and "approximately" indicate that the stated numerical value allows some slight imprecision (e.g., with some approach to exactness in the value; reasonably close to the value; nearly; essentially). If the imprecision provided by "about" or "approximately" is not otherwise understood with this meaning, then "about" and "approximately" as used herein indicate at least variations that may arise from methods of measuring and using such parameters. Further, the terminology "substantially" also refers to a slight imprecision of a condition (e.g., with some approach to exactness of the condition; approximately or reasonably close to the condition; nearly; essentially). In addition, disclosed numerical ranges include disclosure of all values and further divided ranges within the entire range. Each value within a range and the endpoints of a range are all disclosed as separate embodiments. The terms "comprising," "comprises," "includes," "including," "has," and "having" are inclusive and therefore specify the presence of stated items, but do not preclude the presence of other items. As used in this disclosure, the term "or" includes any and all combinations of one or more of the listed items.

The above features and advantages and other features and advantages of the present disclosure will be readily apparent from the following detailed description of the embodiments and best modes for carrying out the present disclosure when taken in connection with the accompanying drawings and appended claims.

DETAILED DESCRIPTION

Figure 1:
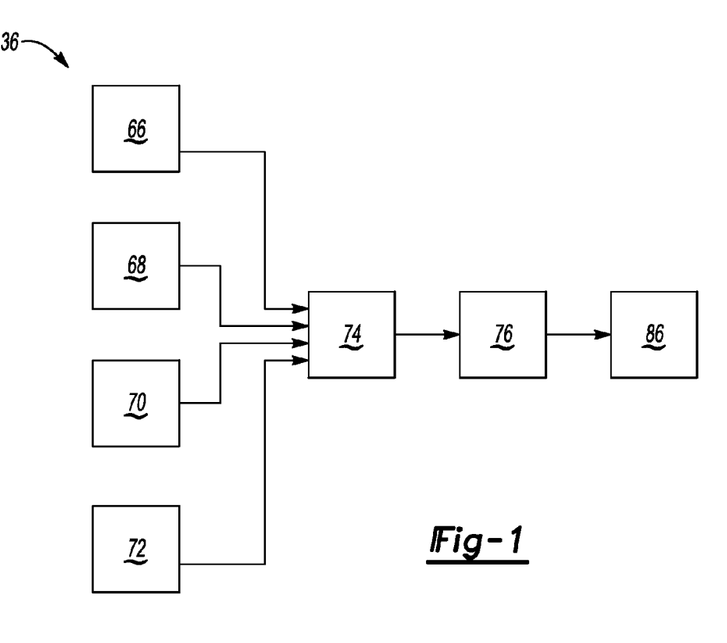
FIG. 1 is a flowchart of a method of operating a shaft furnace.
Figure 2:
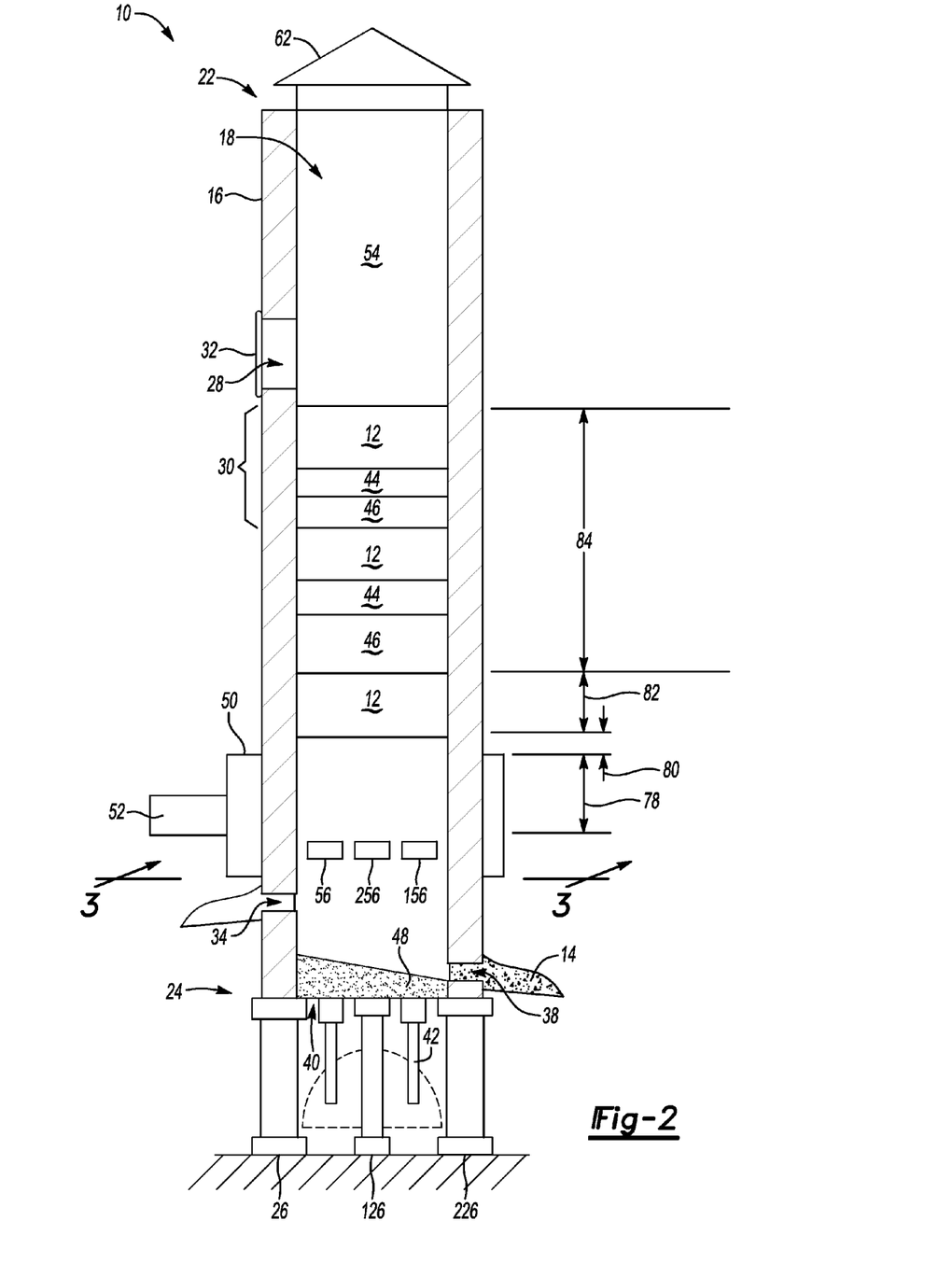
FIG. 2 is a schematic illustration of a cross-sectional side view of a shaft furnace operable by the method of FIG. 1.

Referring to the Figures, wherein like reference numerals refer to like elements, a shaft furnace 10 is shown generally in FIG. 2. The shaft furnace 10 may be any type of shaft furnace 10, such as but not limited to, a cupola furnace, a blast furnace, or a garbage incinerator, and may therefore be useful as a melting device for melting 76 (FIG. 1) a metal feedstock 12 to produce a melted metal material 14. In one non-limiting embodiment, the shaft furnace 10 may be a hot blast cupola furnace and may produce cast iron. As such, the shaft furnace 10 may be useful for foundry applications. However, the shaft furnace 10 may also be useful for other applications, such as steel mills, or for the production of other metallic materials, such as bronzes or non-metallic materials, e.g., mineral wool.

As described with continued reference to FIG. 2, the shaft furnace 10 includes a shell 16 defining a cavity 18 therein. The shell 16 may be formed from any suitable material, such as steel, and may be generally cylindrical. Further, the cavity 18 may be configured as a combustion chamber, and therefore, the shell 16 may be lined with an insulating material, e.g., a plurality of refractory fire bricks. The shell 16 may be suitably sized according to a desired throughput or melt rate of the shaft furnace 10, and in one non-limiting example may have a working height of from about 9 meters to about 13 meters, e.g., about 11 meters, and an internal diameter of from about 2.2 meters to about 2.6 meters, e.g., about 2.4 meters. For embodiments including the insulating material, the shell 16 may be lined for from about 1.8 meters to about 2.8 meters of the working height, e.g., for about 2.1 meters.

As shown generally in FIG. 2, the shell 16 may have a proximal end 22 and a distal end 24 spaced apart from the proximal end 22, and may rest upon a plurality of legs 26, 126, 226. The shell 16 may further define an opening 28 configured for inserting a charge 30 into the cavity 18. The opening 28 may be covered with a charging door 32 that is transitionable between a closed position in which the charging door 32 seals off the opening 28, and an open position in which the charging door 32 is not sealed against the shell 16 to thereby permit insertion of the charge 30 into the cavity 18.

Further, referring again to FIG. 2, the shell 16 may define a slag hole 34 between the opening 28 and the distal end 24 through which slag may be removed from the cavity 18. As set forth in more detail below, slag may be produced as a byproduct of a method 36 (FIG. 1) of operating the shaft furnace 10. The slag may cover the melted metal material 14 to protect the melted metal material 14 from further reaction within the cavity 18, and may thereby reduce heat loss from the melted metal material 14.

In addition, the shell 16 may define a tap hole 38 disposed between the slag hole 34 and the distal end 24 through which the melted metal material 14 may be removed from the cavity 18. That is, the melted metal material 14, e.g., cast iron, may be the end product produced by the shaft furnace 10 and is therefore removable from the cavity 18. The distal end 24 of the shell 16 may also define at least one outlet 40 through which the spent contents of the shaft furnace 10 may be removed during maintenance or after completion of a melt campaign. The shaft furnace 10 may accordingly also include at least one drop door 42 configured for transitioning between a closed position in which the at least one drop door 42 is sealed against the shell 16 to thereby close off the at least one outlet 40, and an open position in which the at least one drop door 42 is not sealed against the shell 16 such that contents of the shaft furnace 10 may be removed from the cavity 18. For example, the at least one drop door 42 may pivot from the closed position in which the at least one drop door 42 is disposed substantially perpendicular to the plurality of legs 26, 126, 226, to the open position in which the at least one drop door 42 is disposed substantially parallel to the plurality of legs 26, 126, 226.

As described with continued reference to FIG. 2, the shaft furnace 10 includes the charge 30 disposed within the cavity 18. The charge 30 includes the metal feedstock 12, a flux material 44, and a mixture 46 including anthracite coal and coke. The metal feedstock 12 may be selected according to the desired properties and composition of the melted metal material 14. For example, the metal feedstock 12 may be selected from bundled loose steel; shredded steel; pig iron; cast iron returns such as scrapped components, connection elements from formed castings, risers, runners, and sprues; and combinations thereof. As such, the melted metal material 14 may be classified as cast iron, ductile base iron, or gray iron.

The flux material 44 may be selected according to desired characteristics of the combustion process used to form the melted metal material 14. For example, the flux material 44 may be selected to reduce a viscosity of the slag as the slag travels towards the slag hole 34 during production of the melted metal material 14. That is, the flux material 44 may react with ash and other impurities to form the slag. The flux material 44 may include any suitable material such as, but not limited to, dolomite limestone, oyster shells, clam shells, fluor-spar, feld-spar, quartz rock, and combinations thereof.

The mixture 46 may be selected as fuel for combustion. The mixture 46 or total solids fuel may be present in the charge 30 in an amount of from about 8 parts by weight to about 13 parts by weight, e.g., from about 9 parts by weight to about 12 parts by weight or from about 9.6 parts by weight to about 10 parts by weight, based on 100 parts by weight of the charge 30. Conversely, a total amount of the remaining portions of the charge 30, e.g., the metal feedstock 12 and the flux material 44, may be present in an amount of from about 87 parts by weight to about 92 parts by weight based on 100 parts by weight of the charge 30. As a non-limiting example, the charge 30 may be 5,000 total pounds or about 2.27 tons (or about 2,270 kg), and the method 36 (FIG. 1) may produce about 52 tons per hour (or about 52,000 kg per hour) of melted metal material 14.

More specifically, the mixture 46 includes both anthracite coal and coke. In particular, the anthracite coal may be characterized as hard, lump, high-grade anthracite coal, and may have a first dimension, such as a width, of from about 76 mm to about 127 mm, e.g., about 102 mm, and may have a second dimension, such as a length, of from about 127 mm to about 178 mm, e.g., about 152 mm. Further, the anthracite coal may have an energy content of less than or equal to about 15,000 BTU/lb. (or about 34,890 kJ/kg), e.g., from about 12,700 BTU/lb. (or about 29,540 kJ/kg) to about 13,900 BTU/lb. (or about 32,331 kJ/kg), or about 13,300 BTU/lb. (or about 30,936 kJ/kg).

A chemical composition of the anthracite coal may include carbon, sulfur, oxygen, nitrogen, a volatile component, a moisture component, and ash. In particular, the anthracite coal may be expressed by the chemical formula $C_{240}H_{90}O_4NS$. Carbon may be present in an amount of from about 84 parts by weight to about 98 parts by weight, e.g., about 84 parts by weight or about 86 parts by weight or about 88 parts by weight, based on 100 parts by weight of the anthracite coal. Sulfur may be present in an amount of less than or equal to about 0.8 parts by weight, e.g., less than or equal to about 0.65 parts by weight, based on 100 parts by weight of the anthracite coal. The volatile component may include, for example, aliphatic carbon atoms, aromatic hydrocarbons, and mineral matter and may be driven off from the anthracite coal when the anthracite coal is heated to about 950° C. in an absence of air. The volatile component may be present in an amount of from about 3.5 parts by weight to about 6.5 parts by weight based on 100 parts by weight of the anthracite coal. For example, the volatile component may be present in an amount of about 5 parts by weight based on 100 parts by weight of the anthracite coal. The moisture component may include, for example, water, and an amount of the moisture component may be determined by heating an air-dried sample of the anthracite coal at from about 105° C. to about 110° C. until a constant weight of the anthracite coal is obtained. The moisture component may be present in an amount of less than or equal to about 15 parts by weight based on 100 parts by weight of the anthracite coal. More specifically, the moisture component may be present in an amount of from about 0.1 part by weight to about 6 parts by weight, e.g., from about 1.6 parts by weight to about 2.4 parts by weight, or about 2 parts by weight, based on 100 parts by weight of the anthracite coal. Ash may be present in an amount of from about 5 parts by weight to about 20 parts by weight based on 100 parts by weight of the anthracite coal. For example, ash may be present in an amount of from about 6.5 parts by weight to about 8.5 parts by weight, such as about 7.5 parts by weight, based on 100 parts by weight of the anthracite coal.

As used herein, the terminology "coke" refers to a solid carbonaceous residue derived from low-ash, low-sulfur bituminous coal from which any volatile constituents are driven off by baking in an oven without oxygen at a temperature of up to about 1,000° C. so that fixed carbon and residual ash may fuse together. The coke may include carbon and a particulate component or "fines". Carbon may be present in an amount of from about 90 parts by weight to about 94 parts by weight, e.g., about 92 parts by weight, based on 100 parts by weight of the coke. Further, the particulate component may be present in an amount of from about 5 parts by weight to about 9 parts by weight, e.g., about 7 parts by weight, based on 100 parts by weight of the coke. The coke may also include a moisture component present in an amount of from about 0.1 part by weight to about 4 parts by weight, e.g., about 2 parts by weight, based on 100 parts by weight of the coke.

The charge 30 may be characterized by a fuel ratio, wherein the fuel ratio is a ratio of an amount of coke present in the mixture 46 to an amount of anthracite coal present in the mixture 46. The fuel ratio may be from about 1:0.1 to about 1:0.6, e.g., about 1:0.13 or about 1:0.23 or about 1:0.33 or about 1:0.4 or about 1:0.5. As a non-limiting example, anthracite coal may be present in the mixture 46 in an amount of from about 10 parts by weight to about 35 parts by weight, e.g., from about 14.5 parts by weight to about 23 parts by weight or from about 12 parts by weight to about 25 parts by weight, based on 100 parts by weight of the mixture 46. That is, the anthracite coal may replace a portion of the coke within the mixture 46. Generally, about 1 pound of anthracite coal may replace from about 1 pound of coke to about 1.4 pounds of coke, e.g., about 1.15 pounds of coke or about 1.2 pounds of coke. That is, about 0.454 kg of anthracite coal may replace from about 0.454 kg of coke to about 0.635 kg of coke, e.g., about 0.522 kg of coke or about 0.544 kg of coke. The anthracite coal may have a less-intensive burn rate as compared to the coke, and may be comparatively harder and stronger than the coke. Therefore, the anthracite coal may not break down or combust as quickly as the coke within the cavity 18. Further, the anthracite coal may also lower a quantity of carbon monoxide gas produced during melting 76 (FIG. 1) of the metal feedstock 12, which in turn may allow for an increased amount of carbon to be incorporated into or picked up by the metal feedstock 12 as the metal feedstock 12 melts to form the melted metal material 14. In addition, since anthracite coal may be less expensive than coke, the shaft furnace 10 may be cost-effective to operate.

As best shown in FIG. 2, the charge 30 may be arranged as a stacked, layered charge. That is, the charge 30 may include a plurality of layers formed from the mixture 46 and spaced apart from one another within the cavity 18. More specifically, at least one of the plurality of layers formed from the mixture 46 may be disposed between the flux material 44 and the metal feedstock 12. That is, the metal feedstock 12 may be sandwiched between the flux material 44 and one of the plurality of layers formed from the mixture 46. As such, the charge 30 may include a stacked column or repeating structure of metal feedstock 12-flux material 44-layer formed from the mixture 46.

The charge 30 may also include silicon carbide in briquette or lump form. The silicon carbide may be selected to add silicon and carbon to the metal feedstock 12 and melted metal material 14, provide deoxidization, and increase a melt rate by reducing coke consumption. Further, the charge 30 may include calcium carbide to reduce a sulfur content of the melted metal material 14. Likewise, the charge 30 may include other alloying elements selected according to a desired chemical composition of the melted metal material 14. For example, the charge 30 may include ferrosilicon, magnesium ferrosilicon, carbon, copper, and combinations and alloys thereof.

As shown generally in FIG. 2, the shaft furnace 10 may further include a hearth 48. The hearth 48 may be disposed within the cavity 18 at the distal end 24 of the shaft furnace 10. The hearth 48 may be formed from sand and may include, for example, bentonite and one or more additives. The hearth 48 may channel the melted metal material 14 towards the tap hole 38 during melting 76 (FIG. 1) of the metal feedstock 12.

Referring again to FIG. 2, the shaft furnace 10 also includes a windbox 50 configured for collecting a blast air 52. The blast air 52 may be collected from a location external to the shaft furnace 10 and may comprise the constituents of ambient air, e.g., oxygen, nitrogen, water, and carbon dioxide. Further, the blast air 52 may be preheated before entering the cavity 18 by any suitable process. For example, the blast air 52 may be preheated by a stack gas 54 formed during melting 76 of the metal feedstock 12. Although not shown, the windbox 50 may include a plurality of conduits or runners configured for channeling the blast air 52 to the cavity 18.

Figure 3:
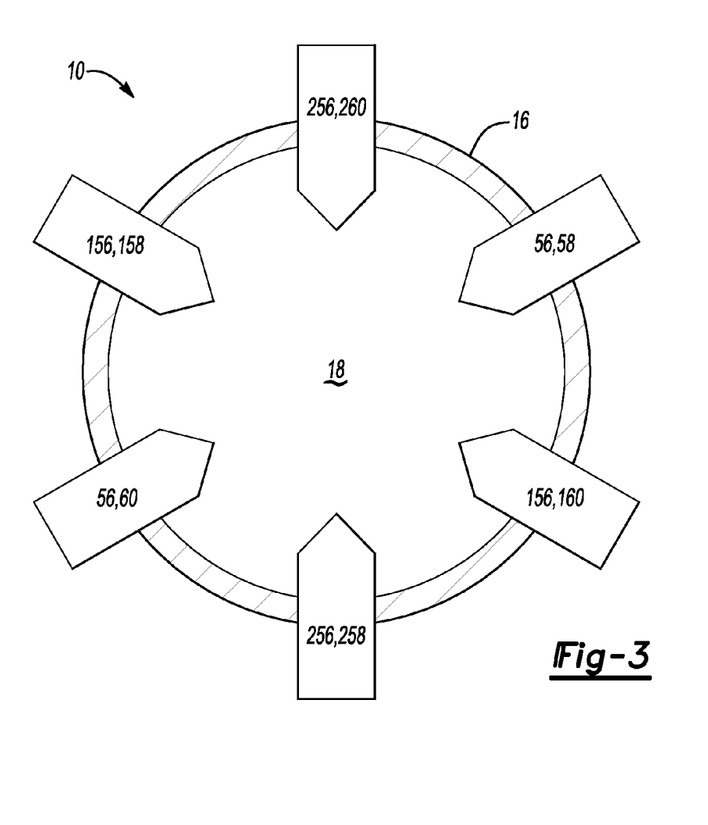
FIG. 3 is a schematic illustration of a cross-sectional plan view of the shaft furnace of FIG. 2 taken along section lines 3-3.

In addition, with continued reference to FIG. 2, the shaft furnace 10 may include a plurality of tuyeres 56, 156, 256 each extending through the shell 16 and configured for introducing the blast air 52 into the cavity 18 at a blast air flow rate. The plurality of tuyeres 56, 156, 256 may have any size and/or configuration, and may be arranged to supply comparatively large volumes of the blast air 52 to the cavity 18 under pressure at the blast air flow rate. As best shown in FIG. 3, the plurality of tuyeres 56, 156, 256 may each be radially spaced apart from one another around a perimeter of the shell 16. In one non-limiting embodiment, the shaft furnace 10 may include from four tuyeres 56, 156, 256 to ten tuyeres 56, 156, 256 e.g., six tuyeres 56, 156, 256. In particular, the shaft furnace 10 may include a first one of the plurality of tuyeres 56, a second one of the plurality of tuyeres 156, and a third one of the plurality of tuyeres 256, wherein the second one of the plurality of tuyeres 256 is spaced apart from and disposed between the first one of the plurality of tuyeres 56 and the third one of the plurality of tuyeres 256.

Referring again to FIG. 3, the shaft furnace 10 may also include at least one burner 58, 158, 258 disposed within the first one of the plurality of tuyeres 56 and configured for injecting 70 (FIG. 1) a first quantity of oxygen gas into the cavity 18 at a first oxygen gas flow rate and natural gas into the cavity 18 at a natural gas flow rate simultaneously. That is, the at least one burner 58, 158, 258 may be configured for supplying natural gas and the first quantity of oxygen gas to the cavity 18 to thereby enhance combustion of the charge 30 within the cavity 18. The at least one burner 58, 158, 258 may be characterized as an oxy-fuel injection burner and may further inject solids, e.g., dust or particulates, into the cavity 18. In one embodiment, the shaft furnace 10 may include a plurality of burners 58, 158, 258, e.g., a first one of the plurality of burners 58, a second one of the plurality of burners 158, and a third one of the plurality of burners 258. A suitable burner 58, 158, 258 may be commercially available from Air Products and Chemicals, Inc. of Allentown, Pa. under the trade name APCOS™.

The natural gas and the first quantity of oxygen gas may be selected to control an efficiency of the combustion process and an environment within the cavity 18. For example, the natural gas flow rate and the first oxygen gas flow rate may be independently adjusted to provide a reducing atmosphere or a neutral atmosphere within the cavity 18 and to control a carbonization of the melted metal material 14. In one non-limiting example, the first quantity of oxygen gas and the natural gas may be simultaneously injected to the cavity 18 at an injection ratio of from about 2 parts oxygen gas to about 1 part natural gas to about 3 parts oxygen gas to about 1 part natural gas.

The first oxygen flow rate may be from about 1,200 feet per second (ft/sec) to about 1,600 ft/sec, or from about 1,300 ft/sec to about 1,500 ft/sec, or about 1,400 ft/sec. That is, the first oxygen flow rate may be from about 365 meters per second (m/s) to about 488 m/s, or from about 396 m/s to about 457 m/s, or about 427 m/s. Such first oxygen flow rates may enable oxygen penetration of the charge 30 and may reduce sculling of the shaft furnace 10. As used herein, the terminology "sculling" refers to a buildup of solidified metal within the cavity 18. Such sculling may foul and/or plug the at least one burner 58, 158, 258, reduce a diameter of the cavity 18, and decrease an operating efficiency of the shaft furnace 10. The aforementioned first oxygen flow rates may also minimize or prevent carbon monoxide gas from climbing the shell 16 of the shaft furnace 10 within the cavity 18.

Injecting 70 (FIG. 1) may include concurrently delivering the natural gas and the first quantity of oxygen to the cavity 18 through the at least one burner 58, 158, 258 at a total flow rate of from about 1 mmBTU/hour to about 6 mmBTU/hour (or from about 1,055 MJ/hour to about 6,335 MJ/hour). That is, the total flow rate of the combination of the first oxygen gas flow rate and the natural gas flow rate through each respective one of the plurality of burners 58, 158, 258 may be from about 1 mmBTU/hour to about 6 mmBTU/hour (or from about 1,055 MJ/hour to about 6,335 MJ/hour). For example, the total flow rate through the at least one burner 58, 158, 258 may be from about 1 mmBTU/hour to about 4 mmBTU/hour (or from about 1,055 MJ/hour to about 4,223 MJ/hour). Therefore, for a shaft furnace 10 that includes three burners 58, 158, 258, a total first quantity of oxygen gas and natural gas may be supplied to the cavity 18 at a total flow rate of from about 3 mmBTU/hr to about 18 mmBTU/hr (or from about 3,167 MJ/hr to about 19,006 MJ/hr), e.g., from about 9 mmBTU/hr to about 12 mmBTU/hr (or from about 9,502 MJ/hr to about 12,670 MJ/hr). At total flow rates greater than the aforementioned quantities, the cavity 18 may include excess carbon monoxide gas and the melted metal material 14 may not include sufficient carbon. Such insufficient carbon may further require an addition of graphite to the cavity 18 and may waste natural gas, which may accordingly increase a cost of operating the shaft furnace 10.

In operation, the at least one burner 58, 158, 258 may not encourage the mixture 46 to burn or combust, but may rather augment an energy content of the mixture 46, e.g., of the coke and/or the anthracite coal. That is, since the anthracite coal may replace carbon otherwise provided by the coke, the at least one burner 58, 158, 258 may not augment a carbon content of the mixture 46 but may rather replace the energy content, e.g., BTUs/hr or MJ/hr, of the coke such that comparatively less coke may be required within the mixture 46.

Referring again to FIG. 3, the shaft furnace 10 also includes at least one lance 160 disposed within the second one of the plurality of tuyeres 156 and configured for driving a second quantity of oxygen gas into the cavity 18 at a supersonic oxygen gas flow rate that is greater than the first oxygen gas flow rate. In particular, although not shown, the at least one lance 160 may be disposed along a central longitudinal axis of the second one of the plurality of tuyeres 156 such that both the tuyere 156 and the at least one lance 160 extend through the shell 16 into the cavity 18. The shaft furnace 10 may include a plurality of lances 60, 160, 260, e.g., a first one of the plurality of lances 60, a second one of the plurality of lances 160, and a third one of the plurality of lances 260. The at least one lance 60, 160, 260 may deliver the second quantity of oxygen gas to the cavity 18 through a nozzle (not shown) at supersonic speeds and may provide the shaft furnace 10 with oxygen enrichment. The nozzle may be any suitable nozzle, such as a convergent-divergent nozzle. As such, the second quantity of oxygen gas may exit the at least one lance 60, 160, 260 at supersonic speed and momentarily separated from the blast air 52 (FIG. 2).

Unlike the first quantity of oxygen gas which is fed to the cavity 18 with a reaction partner, i.e., natural gas, the second quantity of oxygen gas is fed to the cavity 18 without a reaction partner. By way of non-limiting examples, the supersonic oxygen gas flow rate, i.e., a flow rate emitted from one of the plurality of lances 60, 160, 260, may be from about 1,400 ft/sec to about 1,800 ft/sec, or from about 1,500 ft/sec to about 1,700 ft/sec, or about 1,600 ft/sec. That is, the first oxygen flow rate may be from about 426 meters per second (m/s) to about 549 m/s, or from about 457 m/s to about 518 m/s, or about 488 m/s. Such supersonic oxygen gas flow rates may enable oxygen penetration into the charge 30 and may reduce sculling of the shaft furnace 10. Such sculling may foul and/or plug the at least one tuyere 56, 156, 256, reduce a diameter of the cavity 18, and decrease an operating efficiency of the shaft furnace 10. The aforementioned supersonic oxygen gas flow rates may also minimize or prevent carbon monoxide gas from climbing the shell 16 of the shaft furnace 10 within the cavity 18.

As best shown in FIG. 3, for the non-limiting embodiment including six tuyeres 56, 156, 256, the shaft furnace 10 may include three burners 58, 158, 258, i.e., the first one of the plurality of burners 58, the second one of the plurality of burners 158, and the third one of the plurality of burners 258, and three lances 60, 160, 260, i.e., the first one of the plurality of lances 60, the second one of the plurality of lances 160, and the third one of the plurality of lances 260. Each of the three burners 58, 158, 258 may be spaced apart from one another by a respective one of the three lances 60, 160, 260. For example, the shaft furnace 10 may include the first one of the plurality of lances 60 disposed within the first one of the plurality of tuyeres 56, the second one of the plurality of lances 160 disposed within the second one of the plurality of tuyeres 156, and the third one of the plurality of burners 258 disposed within the third one of the plurality of tuyeres 256. Alternatively, the shaft furnace 10 may include the second one of the plurality of burners 158 disposed within the third one of the plurality of tuyeres 256.

Referring again to FIG. 2, the shaft furnace 10 also includes the stack gas 54, which may include a plurality of combustion products such as, but not limited to, carbon monoxide gas, carbon dioxide gas, sulfur dioxide gas, nitric oxide, nitrogen dioxide gas, particulates, volatile organic components, and combinations thereof. The stack gas 54 may rise within the cavity 18 as the metal feedstock 12 is melted during the method 36 (FIG. 1) of operating the shaft furnace 10. The shaft furnace 10 may also include a hood 62 which may cover the cavity 18 at the proximal end 22 of the shaft furnace 10 and direct the stack gas 54 to one or more scrubbers or purifiers (not shown).

The stack gas 54 may be characterized by, for example, a first ratio of parts by weight carbon monoxide gas to parts by weight carbon dioxide gas present in the stack gas 54. In one non-limiting example, the stack gas 54 may include carbon monoxide gas in an amount of from about 10 parts by weight to about 20 parts by weight, or from about 14.8 parts by weight to about 17 parts by weight, based on 100 parts by weight of the stack gas 54. More specifically, the shaft furnace 10 may operate at optimal efficiency, productivity, and/or profitability under operating conditions in which the stack gas 54 includes carbon monoxide gas in an amount of from about 15 parts by weight to about 17 parts by weight based on 100 parts by weight of the stack gas 54.

Without intending to be limited by theory, when carbon monoxide gas is present in the stack gas 54 in an amount of less than about 15 parts by weight, e.g., less than about 14.8 parts by weight or less than about 10 parts by weight, based on 100 parts by weight of the stack gas 54, the shaft furnace 10 may operate under a lean operating condition, i.e., a condition in which too little solids fuel is present in the cavity 18, and additional solids fuels (i.e., the mixture 46 of anthracite coal and coke) may be added to the cavity 18 to rectify the lean operating condition. Under the lean operating condition, comparatively less carbon may be picked up from the metal feedstock 12 as the metal feedstock 12 melts, a temperature within the cavity 18 may be comparatively low such that melting 76 (FIG. 1) of the metal feedstock 12 is delayed or reduced, and the metal feedstock 12 and/or the melted metal material 14 may oxidize. Such oxidation may diminish a quality of the melted metal material 14 and/or decrease an efficiency or productivity of the shaft furnace 10.

Conversely, when carbon monoxide gas is present in the stack gas 54 in an amount of greater than about 17 parts by weight, e.g., greater than about 20 parts by weight, based on 100 parts by weight of the stack gas 54, the shaft furnace 10 may operate under a rich operating condition, i.e., a condition in which too much total solids fuel is present in the cavity 18. Under the rich operating condition, insufficient carbon may be picked up from the metal feedstock 12 as the metal feedstock 12 melts to form the melted metal material 14, which may also diminish a quality of the melted metal material 14. That is, when the stack gas 54 includes carbon monoxide gas present in an amount of greater than about 17 parts by weight, e.g., greater than about 20 parts by weight, based on 100 parts by weight of the stack gas 54, comparatively more carbon monoxide gas may attach to the metal feedstock 12, which may in turn retard carbon pick-up by the melted metal material 14. This rich operating condition may be rectified by adding more solids fuel, i.e., more of the mixture 46 of anthracite coal and coke, to the cavity 18, which may however increase an operating cost of the shaft furnace 10.

In addition, the stack gas 54 may include carbon dioxide gas in an amount of from about 10 parts by weight to about 20 parts by weight, or from about 13 parts by weight to about 16 parts by weight, based on 100 parts by weight of the stack gas 54. Therefore, the first ratio may be from about 1:0.5 to about 1:2, or from about 1:0.8 to about 1:1. Further, the stack gas 54 may be characterized by, for example, a second ratio of parts by weight carbon monoxide gas to total parts by weight of nitric oxide and nitrogen dioxide gas present in the stack gas 54. The stack gas 54 may also be characterized by a temperature of the stack gas 54.

Figure 4:
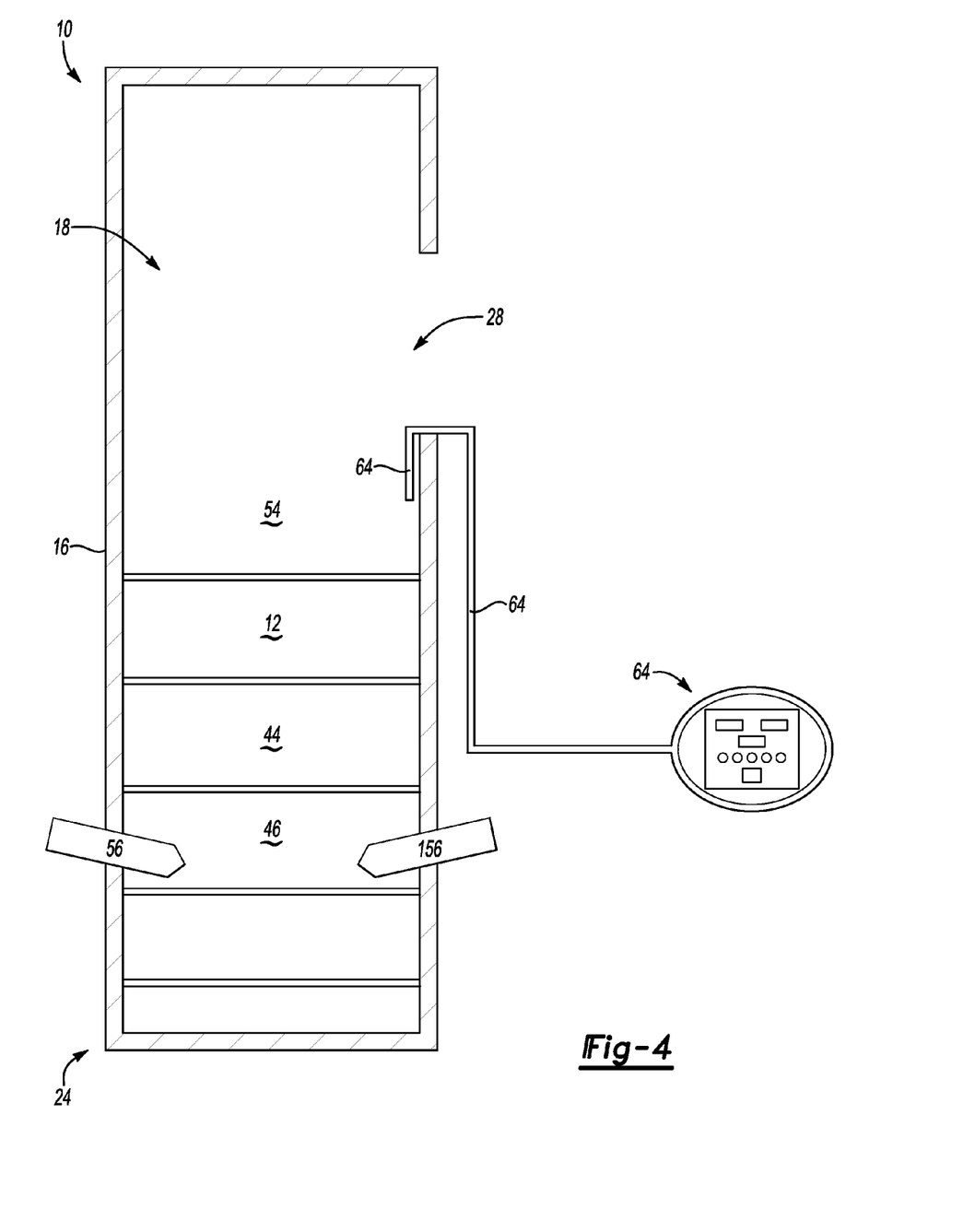
FIG. 4 is a schematic illustration of a cross-sectional side view of a portion of the shaft furnace of FIG. 2, wherein the shaft furnace includes a stack gas analyzer apparatus.

Therefore, referring now to FIG. 4, the shaft furnace 10 also includes a stack gas analyzer apparatus 64 configured for measuring an amount of the plurality of combustion products present in the stack gas 54. For example, the stack gas analyzer apparatus 64 may be a gas analyzer and may monitor the stack gas 54 during operation of the shaft furnace 10. The stack gas analyzer apparatus 64 may extend along the shell 16 within the cavity 18 and may be disposed between the opening 28 and the distal end 24.

Referring now to FIGS. 1 and 2, the method 36 (FIG. 1) of operating the shaft furnace 10 includes inserting 66 (FIG. 1) the mixture 46 including anthracite coal and coke into the cavity 18 defined by the shaft furnace 10. That is, inserting 66 may include disposing from about 10 parts by weight to about 35 parts by weight of anthracite coal based on 100 parts by weight of the mixture 46 within the cavity 18. Therefore, inserting 66 may include maintaining the fuel ratio of the amount of coke present in the mixture 46 to the amount of anthracite coal present in the mixture 46. For example, the method 36 may include maintaining the fuel ratio at from about 1:0.1 to about 1:0.6 or from about 1:0.13 to about 1:0.33. Stated differently, the method 36 may further include replacing at least a portion of the amount of coke present in the mixture 46 with a quantity of anthracite coal.

More specifically, as described with reference to FIGS. 1 and 2, inserting 66 (FIG. 1) may include forming the plurality of layers from the mixture 46 and spacing each of the plurality of layers apart from one another within the cavity 18. That is, the method 36 includes disposing 68 (FIG. 1) the metal feedstock 12 within the cavity 18, and may further include loading the flux material 44 into the cavity 18. It is to be appreciated that the mixture 46 may be inserted into the cavity 18 before, after, or concurrent to disposing 68 the metal feedstock 12 and/or flux material 44 into the cavity 18. Therefore, inserting 66 may include positioning at least one of the plurality of layers between the flux material 44 and the metal feedstock 12. Further, inserting 66 may include sandwiching the metal feedstock 12 between the flux material 44 and one of the plurality of layers.

In addition, inserting 66 may include disposing anthracite coal having the first dimension of from about 76 mm to about 127 mm and the second dimension of from about 127 mm to about 178 mm within the cavity 18. Inserting 66 may also include disposing anthracite coal having an energy content of from about 12,700 BTU/hr to about 13,900 BTU/hr within the cavity 18 (or from about 13 MJ/hr to about 15 MJ/hr). Further, inserting 66 may include disposing anthracite coal including carbon present in an amount of from about 84 parts by weight to about 88 parts by weight based on 100 parts by weight of the anthracite coal within the cavity 18. Inserting 66 may also include disposing anthracite coal including sulfur present in an amount of less than or equal to about 0.8 parts by weight based on 100 parts by weight of the anthracite coal within the cavity 18. In addition, inserting 66 may include disposing anthracite coal including a volatile component present in an amount of from about 3.5 parts by weight to about 6.5 parts by weight based on 100 parts by weight of the anthracite coal within the cavity 18. Inserting 66 may also include disposing anthracite coal including a moisture component present in an amount of from about 0.1 part by weight to about 6 parts by weight based on 100 parts by weight of the anthracite coal within the cavity 18. Further, inserting 66 may include disposing anthracite coal including ash present in an amount of from about 6.5 parts by weight to about 8.5 parts by weight based on 100 parts by weight of the anthracite coal within the cavity 18.

Inserting 66 may also include disposing coke including carbon in an amount of from about 90 parts by weight to about 94 parts by weight based on 100 parts by weight of the coke within the cavity 18. Inserting 66 may also include disposing coke including the particulate component in an amount of from about 5 parts by weight to about 9 parts by weight based on 100 parts by weight of the coke within the cavity 18.

Referring again to FIG. 1, the method 36 also includes injecting 70 natural gas at the natural gas flow rate and the first quantity of oxygen gas at the first oxygen gas flow rate into the cavity 18 simultaneously through the at least one burner 58, 158, 258. In addition, the method 36 may include determining specific natural gas flow rates which correlate with specific first oxygen gas flow rates to thereby optimize operation of the shaft furnace 10 and achieve a desired throughput of the melted metal material 14.

Further, the method 36 includes driving 72 the second quantity of oxygen gas at the supersonic oxygen gas flow rate of from about 1,400 feet per second (or about 427 meters per second) to about 1,800 feet per second (or about 549 meters per second) into the cavity 18 through the at least one lance 60, 160, 260, to thereby decrease the initial amount of carbon monoxide gas present in the stack gas 54, wherein the supersonic oxygen gas flow rate is greater or larger than the first oxygen gas flow rate. As set forth above, the method 36 may also include introducing the blast air 52 into the cavity 18 at the blast air flow rate. The method 36 may therefore also include determining specific blast air flow rates that correlate to optimal natural gas flow rates at specific first oxygen gas flow rates and specific supersonic oxygen gas flow rates to thereby increase heat generation within the cavity 18, reduce silicon loss from the melted metal material 14, and allow excellent penetration of oxygen gas into the charge 30. The natural gas and the first quantity of oxygen gas may be injected into the cavity 18 before, after, or concurrent to driving 72 the second quantity of oxygen gas into the cavity 18 and/or introducing the blast air 52 into the cavity 18.

Therefore, with continued reference to FIG. 1, the method 36 includes combusting 74 the mixture 46 within the cavity 18 to produce the stack gas 54 and melting 76 the metal feedstock 12 to produce the melted metal material 14. More specifically, combusting 74 may include minimizing the amount of carbon monoxide gas present in the stack gas 54. Further, combusting 74 may include minimizing the total amount of nitric oxide and nitrogen dioxide gas present in the stack gas 54. Likewise, combusting 74 may include minimizing the amount of sulfur dioxide gas present in the stack gas 54.

As described with reference to FIG. 2, combusting 74 may include processing the metal feedstock 12 through a combustion zone 78, a reducing zone 80, and a melting zone 82 of the shaft furnace 10. Combusting 74 may specifically occur within the combustion zone 78. The combustion zone 78 may extend from the plurality of tuyeres 56, 156, 256 to a boundary below which all of the oxygen of the blast air 52, the first quantity of oxygen gas, and the second quantity of oxygen gas is consumed via reactions (I) and (II):

$$C(\text{coke+anthracite coal}) + O_2(\text{blast air+enhancing oxygen}) \rightarrow CO_2 + \text{heat} \quad (I)$$

$$Si + O_2 \rightarrow SiO_2 + \text{heat} \quad (II)$$

The combustion zone 78 may have a temperature of from about 1,540° C. to about 1,870° C., e.g., about 1,800° C.

Further, the reducing zone 80 may extend from a top of the combustion zone 78 to a first layer of the metal feedstock 12. Carbon monoxide gas produced within the combustion zone 78 may rise towards the proximal end 22 of the shaft furnace 10 and may be reduced to carbon monoxide gas via reaction (III):

$$CO_2 + C \rightarrow 2CO - \text{heat} \quad (III)$$

The reducing zone 80 may have a temperature of from about 1,100° C. to about 1,700° C., e.g., about 1,200° C.

The melting zone 82 may extend from the first layer of metal feedstock 12 to the first one of the plurality of layers formed from the mixture 46. That is, the reducing zone 80 may be disposed between the melting zone 82 and the combustion zone 78. The metal feedstock 12 may melt within the melting zone 82 of the shaft furnace 10 according to reaction (IV):

$$3Fe + 2CO \rightarrow Fe_3C + CO_2 \quad (IV)$$

The shaft furnace 10 may further include a preheating zone 84 disposed between the proximal end 22 and the melting zone 82. That is, the preheating zone 84 may include the remaining layers of the charge 30 that are disposed between the first layer of metal feedstock 12 and the proximal end 22. As combustion occurs, the stack gas 54 may rise within the cavity 18 towards the proximal end 22 to thereby heat the remaining layers of the charge 30 disposed in the preheating zone 84. The preheating zone 84 may have a temperature of, for example, up to about 1,050° C.

Therefore, with continued reference to FIG. 1, the method 36 also includes monitoring 86 the stack gas 54 to thereby operate the shaft furnace 10. Such monitoring 86 may be continuous or intermittent according to desired operation conditions. Monitoring 86 may specifically include measuring an amount of carbon monoxide gas, an amount of carbon dioxide gas, an amount of nitric oxide, and/or an amount of nitrogen dioxide gas present in the stack gas 54. For example, monitoring 86 may include analyzing the first ratio of parts by weight carbon monoxide gas to parts by weight carbon dioxide gas present in the stack gas 54. That is, monitoring 86 may include measuring the first ratio and changing or correcting one or more inputs or raw materials of the shaft furnace 10, such as an amount of charge 30, anthracite coal, coke, first quantity of oxygen, second quantity of oxygen, and natural gas, so that carbon monoxide gas is present in the stack gas 54 in an amount of from about 10 parts by weight to about 20 parts by weight, e.g., from about 14.8 parts by weight to about 17 parts by weight, based on 100 parts by weight of the stack gas 54. Further, monitoring 86 may include analyzing the second ratio of parts by weight carbon monoxide gas to a total parts by weight of nitric oxide and nitrogen dioxide gas present in the stack gas 54.

Alternatively or additionally, the stack gas 54 may include an initial amount of sulfur dioxide gas and an initial amount of carbon monoxide gas, and the method 36 may include increasing the natural gas flow rate and the first oxygen gas flow rate to thereby reduce the initial amount of sulfur dioxide gas and the initial amount of carbon monoxide gas present in the stack gas 54. Monitoring 86 may also include measuring the temperature of the stack gas 54.

Therefore, monitoring 86 may include tuning the shaft furnace 10 and adjusting one or more inputs to or raw materials of the shaft furnace 10, such as the amount of charge 30, anthracite coal, coke, first quantity of oxygen, second quantity of oxygen, and natural gas. That is, the method 36 may include changing at least one of the natural gas flow rate, the first oxygen gas flow rate, and the blast air flow rate according to an amount of the mixture 46 present in the cavity 18. Monitoring 86 the stack gas 54 may therefore including verifying that the shaft furnace 10 is operating under conditions in which a desired amount of charge 30, anthracite coal, coke, first quantity of oxygen, second quantity of oxygen, and natural gas is supplied to the shaft furnace 10 to produce a predetermined, desired quantity of melted metal material 14. Such verification and/or adjustment of the one or more inputs may increase a cost-effectiveness, profitability, and/or productivity of the shaft furnace 10, for example by optimizing the quantity of total solids fuel fed to the shaft furnace 10. As such, monitoring 86 the stack gas 54 with the stack gas analyzer apparatus 64 may provide a feedback and control loop for operation of the shaft furnace 10, and may include determining a cause of a given effect or property of the melted metal material 14.

For example, monitoring 86 may include evaluating and adjusting the fuel ratio, i.e., the ratio of the amount of coke present in the mixture 46 to the amount of anthracite coal present in the mixture 46. That is, monitoring 86 the stack gas 54 may include determining whether the charge 30 includes the optimal fuel ratio. As such, monitoring 86 the stack gas 54 with the stack gas analyzer apparatus 64 may indicate whether the shaft furnace 10 is operating under the rich operating condition, i.e., the condition in which too much total solids fuel is present in the cavity 18; under an optimal operating condition, i.e., a condition in which the desired fuel ratio is present in the cavity 18; or under the lean operating condition, i.e., the condition in which too little total solids fuel is present in the cavity 18. Therefore, monitoring 86 the stack gas 54 may allow an operator to measure and correct the fuel ratio and adjust the respective amounts of anthracite coal and coke present in the charge 30 and/or cavity 18.

During optimal operation of the shaft furnace 10, the method 36 may produce high-quality melted metal material 14 at optimal efficiency. More specifically, the shaft furnace 10 may be pre-heated, the mixture 46 may be inserted into the cavity 18, and the metal feedstock 12 may be disposed within the cavity 18. As the blast air 52 is introduced to the cavity 18 from the windbox 50, natural gas and the first quantity of oxygen gas are injected into the cavity 18 simultaneously through the at least one burner 58, 158, 258, and the second quantity of oxygen gas is driven into the cavity 18 through the at least one lance 60, 160, 260. The mixture 46 is then ignited and combusted, and heat is produced. As a temperature within the cavity 18 increases, the metal feedstock 12 melts and passes through the mixture 46 and collects within the hearth 48 to form the melted metal material 14. The melted metal material 14 may then periodically be removed through the tap hole 38. Likewise, comparatively lighter molten slag may accumulate within the mixture 46 disposed below the plurality of tuyeres 56, 156, 256 until the molten slag may also be removed from the slag hole 34.

However, with continued reference to the method 36, at times, variations in raw materials (e.g., the charge 30, the metal feedstock 12, the blast air 52, etc.) and/or processing conditions (e.g., humidity, ambient temperature, sculling severity, etc.) may cause the shaft furnace 10 to operate in a less-than-optimal manner.

For example, efficient operation of the at least one burner 58, 158, 258 may increase the energy content of the mixture 46 such that the shaft furnace 10 includes excess fuel. When the shaft furnace 10 includes excess fuel, i.e., when the energy content of the mixture 46 is too high, excess carbon monoxide gas may be formed within the cavity 18 according to reaction (III) set forth above. That is, the blast air 52 introduced to the cavity 18 along with the natural gas and the first quantity of oxygen gas from the at least one burner 58, 158, 258 may be rich with carbon dioxide gas and moisture from the windbox 50, and may promote production of carbon monoxide gas according to reaction (III). Since reaction (III) is endothermic and requires heat, the production of excess carbon monoxide gas may decrease a temperature within the cavity 18 and may slow the melting 76 of the metal feedstock and thereby decrease an operating efficiency of the shaft furnace 10.

As such, monitoring 86 the stack gas 54 for excess carbon monoxide gas may correct this less-than-optimal operating condition of the shaft furnace 10, which may be referred to as an overcoked bed. In particular, the method 36 may include corrective measures such as evaluating the blast air flow rate and changing an amount of coke present in the mixture 46 according to the blast air flow rate. More specifically, the method 36 may include decreasing the amount of coke present in the mixture 46 to thereby increase an amount of carbon incorporated into the metal feedstock 12 as the metal feedstock 12 melts to form the melted metal material 14. Alternatively or additionally, the method 36 may include decreasing the natural gas flow rate through the at least one burner 58, 158, 258 and increasing the first oxygen gas flow rate through the at least one burner 58, 158, 258 to thereby minimize the initial amount of carbon monoxide gas present in the stack gas 54. That is, the natural gas flow rate may be decreased and the first oxygen gas flow rate may be increased so that the mixture 46 may burn and the formation of carbon monoxide gas may be minimized.

As a further example of a condition which may cause the shaft furnace 10 to operate in a less-than-optimal manner, humidity present in the ambient air collected by the windbox 50 may introduce excess moisture into the cavity 18. As such, the method 36 may include increasing the natural gas flow rate and the first oxygen gas flow rate and decreasing the blast air flow rate to thereby reduce the initial amount of sulfur dioxide gas and the initial amount of carbon monoxide gas present in the stack gas 54 and reduce a moisture content of the cavity 18. For example, depending on a humidity of the blast air 52, given a blast air flow rate of about 5,000 standard cubic feet per minute, scfm, (or about 2.36 cubic meters per second) about 600 lbs. (or about 272 kg) or about 75 gallons (or about 284 liters) of water may be introduced to the cavity 18 per hour. As such, by way of a non-limiting example, the natural gas flow rate and the first oxygen gas flow rate may be increased to thereby decrease the blast air flow rate from about 10,000 scfm (or about 283.2 cubic meters per minute) to about 9,000 scfm (or about 254.9 cubic meters per minute), and reduce the moisture content of the cavity 18 by about 15 gallons (or about 56.8 liters) per hour. Further, increasing the natural gas flow rate and the first oxygen gas flow rate may also increase a temperature at a tip (not shown) of a nozzle (not shown) of a respective one of the plurality of tuyeres 56, 156, 256, which may further drive off moisture of the blast air 52 supplied by the windbox 50. Since about 1.9 lbs. (or about 0.862 kg) of coke may be required as fuel to burn off about 1 lb. (or about 0.454 kg) of water, about 20 lbs. (or about 9.071 kg) of coke per minute to about 23 lbs. (or about 10.433 kg) of coke per minute may be required for a blast air flow rate of about 10,000 scfm (or about 283.2 cubic meters per minute). For conditions in which the mixture 46 is inserted into the cavity 18 at a rate of once per about 3 minutes, increasing the natural gas flow rate and the first oxygen gas flow rate while decreasing the blast air flow rate may decrease an amount of coke required for the mixture 46 by from about 60 lbs. (or about 27.2 kg) to about 70 lbs. (or about 31.8 kg). Therefore, the method 36 is cost-effective and energy efficient.

As an additional example of a condition which may cause the shaft furnace 10 to operate in a less-than-optimal manner, the mixture 46 may include a portion of coke that is of comparatively lesser quality than another portion of the coke. For example, the coke may include the particulate component, i.e., fines, in an amount of greater than about 9 parts by weight based on 100 parts by weight of the coke. Alternatively or additionally, inserting 66 (FIG. 1) may include disposing coke including carbon in an amount of less than about 90 parts by weight based on 100 parts by weight of the coke within the cavity 18. Such poor coke quality may not readily ignite during combustion, and may instead break down and/or plug the tap hole 38. As such, the method 36 may include corrective actions such as increasing the natural gas flow rate and the first oxygen flow rate. That is, increasing the natural gas flow rate and the first oxygen flow rate may compensate for poor coke quality and may provide the mixture 46 with any missing energy content, i.e., BTU/hr or MJ/hr, that would otherwise be provided by the poor quality coke. That is, the at least one burner 58, 158, 258 may stabilize operation of the shaft furnace 10 by adding sufficient energy content necessary for combustion without requiring additional coke for the mixture 46. As such, the method is further cost-effective and energy efficient.

Alternatively or additionally, the moisture content of the coke may be too high. Such moisture-rich coke may be over-quenched or may be fouled during transportation and/or storage. As such, inserting 66 (FIG. 1) may include disposing coke including the moisture component present in an amount of greater than about 4 parts by weight based on 100 parts by weight of the coke within the cavity 18. By way of a non-limiting example, an about 420 lbs. (or about 190.5 kg) addition of coke to the cavity 18 may include about 8.4 lbs. (or about 3.7 kg) of water (assuming a 2% moisture content). However, the 420 lbs. addition of coke to the cavity 18 may include about 33.6 lbs. (or about 15.2 kg) of water at an 8% moisture content. Stated differently, the moisture-rich coke may only provide about 387 lbs. (or about 175.5 kg) of coke. As such, the method 36 may further include increasing the natural gas flow rate and the first oxygen gas flow rate to thereby extend the preheating zone 84 towards the proximal end 22 of the shaft furnace 10 and more effectively burn off the moisture content of the coke. Although modifying the operation parameters of the at least one burner 58, 158, 258 cannot replace a quantity of coke necessary for a properly functioning mixture 46, increasing the natural gas flow rate and the first oxygen gas flow rate may assist the shaft furnace 10 to return to optimal operating conditions.

As another non-limiting example of a condition which may cause the shaft furnace 10 to operate in a less-than-optimal manner, the shaft furnace 10 may exhibit excess backpressure. As used herein, the terminology "backpressure" refers to a resistance to air flow within the cavity 18. Such backpressure may be measured within the windbox 50. Generally, backpressure may exert a force on the slag and may contribute to undesirable fouling of the plurality of tuyeres 56, 156, 256, undesirable removal of melted metal material 14 from the tap hole 38, and/or premature wear of the tap hole 38. Therefore, the method 36 may include evaluating the backpressure of the shaft furnace 10 and may include, during melting 76, evaluating a charging ratio of the blast air flow rate to an amount of the mixture 46 disposed in the cavity 18. Further, the method 36 may include increasing the natural gas flow rate and the first oxygen gas flow rate to thereby reduce the blast air flow rate. For example, the blast air flow rate may be about 9,000 scfm (or about 254.9 cubic meters per minute) or about 9,500 scfm (or about 269 cubic meters per minute) or about 10,000 scfm (or about 283.2 cubic meters per minute) or about 10,500 scfm (or about 297.3 cubic meters per minute) or about 11,000 scfm (or about 311.5 cubic meters per minute) or about 11,500 scfm (or about 325.6 cubic meters per minute) or about 12,000 scfm (or about 339.8 cubic meters per minute) or about 12,500 scfm (or about 354 cubic meters per minute) or about 13,000 scfm (or about 368.1 cubic meters per minute) or about 13,500 scfm (or about 382.3 cubic meters per minute) or about 14,000 scfm (or about 396.4 cubic meters per minute) or about 14,500 scfm (or about 410.6 cubic meters per minute) or about 15,000 scfm (or about 424.8 cubic meters per minute) or about 15,500 scfm (or about 438.9 cubic meters per minute). Likewise, the backpressure may be from about 19 oz. (or about 561.9 cubic centimeters) to about 30 oz. (or about 887.2 cubic centimeters) or from about 20 oz. (or about 591.5 cubic centimeters) to about 31 oz. (or about 916.8 cubic centimeters) or from about 21 oz. (or about 621.0 cubic centimeters) to about 32 oz. (or about 946.4 cubic centimeters) or from about 22 oz. (or about 650.6 cubic centimeters) to about 33 oz. (or about 975.9 cubic centimeters) or from about 23 oz. (or about 680.2 cubic centimeters) to about 34 oz. (or about 1005.5 cubic centimeters) or from about 24 oz. (or about 709.8 cubic centimeters) to about 35 oz. (or about 1035.1 cubic centimeters) or from about 25 oz. (or about 739.3 cubic centimeters) to about 36 oz. (or about 1064.6 cubic centimeters) or from about 26 oz. (or about 768.9 cubic centimeters) to about 37 oz. (or about 1094.2 cubic centimeters) or from about 27 oz. (or about 798.5 cubic centimeters) to about 38 oz. (or about 1,123.8 cubic centimeters) or from about 28 oz. (or about 828.1 cubic centimeters) to about 39 oz. (or about 1,153.4 cubic centimeters) or from about 29 oz. (or about 857.6 cubic centimeters) to about 40 oz. (or about 1,182.9 cubic centimeters) or from about 30 oz. (or about 887.2 cubic centimeters) to about 41 oz. (or about 1,212.5 cubic centimeters) or from about 31 oz. (or about 916.8 cubic centimeters) to about 42 oz. (or about 1,242.1 cubic centimeters) or from about 32 oz. (or about 946.4 cubic centimeters) to about 43 oz. (or about 1,271.7 cubic centimeters).

In addition, the method 36 may further include comparing the blast air flow rate and an amount of melted metal material 14 produced by the shaft furnace 10. For example, the blast air flow rate may be about 9,000 scfm (or about 254.9 cubic meters per minute) or about 10,000 scfm (or about 283.2 cubic meters per minute) or about 10,500 scfm (or about 297.3 cubic meters per minute) or about 11,000 scfm (or about 311.5 cubic meters per minute) or about 11,500 scfm (or about 325.6 cubic meters per minute) or about 12,000 scfm (or about 339.8 cubic meters per minute) or about 13,000 scfm (or about 368.1 cubic meters per minute) and the amount of melted metal material 14 may be about 37.5 tons (or about 37,500 kg) per hour or about 40 tons (or about 40,000 kg) per hour or about 42 tons (or about 42,000 kg) per hour or about 42.5 tons (or about 42,500 kg) per hour or about 45 tons (or about 45,000 kg) per hour or about 47.5 tons (or about 47,500 kg) per hour or about 50 tons (or about 50,000 kg) per hour or about 52 tons (or about 52,000 kg) per hour or greater than or equal to about 52.5 tons (or about 52,500 kg) per hour.

Therefore, the method 36 and shaft furnace 10 are cost-effective and efficient and may mitigate increasing energy costs required to melt the metal feedstock 12. Further, the method 36 may reduce an amount of carbon monoxide gas, carbon dioxide gas, nitric oxide, nitrogen dioxide gas, and sulfur dioxide gas present in the stack gas 54 during operation of the shaft furnace 10. For example, the method 36 may reduce the aforementioned combustion products in the stack gas 54 by from about 50% to about 85%, such as about 80%, as compared to other methods (not shown) of operating other shaft furnaces (not shown).

In particular, including anthracite coal in the mixture 46 may decrease production of carbon monoxide gas within the cavity 18 during melting 76 and may therefore reduce the amount of carbon monoxide gas present in the stack gas 54. That is, as set forth above, the method 36 may include replacing at least a portion of the amount of coke present in the mixture 46 with the quantity of anthracite coal to thereby reduce the initial amount of carbon monoxide gas in the stack gas 54. Therefore, the method 36 and shaft furnace 10 may reduce emissions of carbon monoxide gas by, for example, from about 50% to about 85%, such as about 80%, as compared to other methods (not shown) for operating other shaft furnaces (not shown).

In addition, since the method 36 replaces a portion of the coke with anthracite coal to form the mixture 46, the method 36 may also reduce sulfur dioxide gas present in the stack gas 54. That is, since anthracite coal includes sulfur in an amount of about 0.52 parts by weight based on 100 parts by weight of the anthracite coal, and coke includes sulfur in an amount of about 0.68 parts by weight based on 100 parts by weight of the coke, the method 36 may reduce sulfur dioxide gas emissions from the shaft furnace 10 to the ambient environment.

Advantageously, monitoring 86 the stack gas 54 may reduce a quantity of coke required for the mixture 46 to sufficiently combust, and may therefore decrease a cost of operating the shaft furnace 10. That is, since anthracite coal may cost up to about 45% less than coke, inserting 66 the mixture 46 into the cavity 18 may be cost-effective. Monitoring 86 the stack gas 54 with the stack gas analyzer apparatus 64 may also provide a feedback loop for operation of the shaft furnace 10, may include efficiently determining a cause of a given effect or property of the melted metal material 14, and may therefore optimize a quality of the melted metal material 14. That is, monitoring 86 the conditions and make-up of the stack gas 54 may predict the quantity and quality of the melted metal material 14, and may allow for quick correction or adjustment of one or more inputs or raw materials of the shaft furnace 10.

While the best modes for carrying out the disclosure have been described in detail, those familiar with the art to which this disclosure relates will recognize various alternative designs and embodiments for practicing the disclosure within the scope of the appended claims.

The invention claimed is:

1. A method of operating a cupola furnace, the method comprising:
   inserting a mixture including anthracite coal and coke into a cavity defined by the cupola furnace;
   disposing a metal feedstock within the cavity;
   injecting natural gas at a natural gas flow rate and a first quantity of oxygen gas at a first oxygen gas flow rate into the cavity simultaneously through at least one burner;
   driving a second quantity of oxygen gas at a supersonic oxygen gas flow rate into the cavity through at least one lance, wherein the supersonic oxygen gas flow rate is greater than the first oxygen gas flow rate;
   combusting the mixture within the cavity to produce a stack gas;
   melting the metal feedstock to produce a melted cast iron, ductile base iron or gray iron material; and
   monitoring the stack gas to thereby operate the cupola furnace.

2. The method of claim 1, wherein inserting includes maintaining a fuel ratio of an amount of coke present in the mixture to an amount of anthracite coal present in the mixture at from about 1:0.1 to about 1:0.6.

3. The method of claim 1, wherein inserting includes disposing from about 10 parts by weight to about 35 parts by weight of anthracite coal based on 100 parts by weight of the mixture within the cavity, and further wherein the anthracite coal includes carbon in an amount of from about 84 parts by weight to about 98 parts by weight based on 100 parts by weight of the anthracite coal.

4. The method of claim 1, wherein the stack gas includes an initial amount of carbon monoxide gas, and further includes replacing at least a portion of an amount of coke present in the mixture with a quantity of anthracite coal to thereby reduce the initial amount of carbon monoxide gas present in the stack gas.

5. The method of claim 1, wherein injecting includes concurrently delivering the natural gas and the first quantity of oxygen to the cavity through the at least one burner at a total flow rate of from about 1 mm BTU/hour to about 6 mm BTU/hour.

6. The method of claim 1, wherein the stack gas includes an initial amount of carbon monoxide gas, and further wherein driving includes delivering the second quantity of oxygen to the cavity at the supersonic oxygen flow rate of from about 1,400 feet per second to about 1,800 feet per second to thereby decrease the initial amount of carbon monoxide gas present in the stack gas.

7. The method of claim 1, further including introducing a blast air to the cavity at a blast air flow rate.

8. The method of claim 7, further including changing an amount of coke present in the mixture according to the blast air flow rate.

9. The method of claim 8, further including decreasing the amount of coke present in the mixture to thereby increase an amount of carbon incorporated into the metal feedstock as the metal feedstock melts to form the melted cast iron, ductile base iron or gray iron material.

10. The method of claim 7, wherein the stack gas includes an initial amount of carbon monoxide gas and an initial amount of sulfur dioxide gas, and further including changing at least one of the natural gas flow rate, the first oxygen gas flow rate, and the blast air flow rate according to an amount of the mixture present in the cavity.

11. The method of claim 10, further including decreasing the natural gas flow rate and increasing the first oxygen gas flow rate to thereby minimize the initial amount of carbon monoxide gas present in the stack gas.

12. The method of claim 10, further including increasing the natural gas flow rate and the first oxygen gas flow rate and decreasing the blast air flow rate to thereby reduce the initial amount of sulfur dioxide gas and the initial amount of carbon monoxide gas present in the stack gas.

13. The method of claim 10, further including, during melting, evaluating a charging ratio of the blast air flow rate to an amount of the mixture disposed in the cavity.

14. The method of claim 13, further including increasing the natural gas flow rate and the first oxygen gas flow rate to thereby reduce the blast air flow rate.

15. The method of claim 1, wherein the stack gas includes carbon monoxide gas and carbon dioxide gas, and further wherein monitoring includes analyzing a first ratio of parts by weight carbon monoxide gas to parts by weight carbon dioxide gas present in the stack gas.

16. The method of claim 1, wherein the stack gas includes carbon monoxide gas, nitric oxide, and nitrogen dioxide gas, and further wherein monitoring includes analyzing a second ratio of parts by weight carbon monoxide gas to a total parts by weight of nitric oxide and nitrogen dioxide gas present in the stack gas.

17. The method of claim 1, wherein combusting includes minimizing an amount of carbon monoxide gas, an amount of sulfur dioxide, and a total amount of nitric oxide and nitrogen dioxide present in the stack gas.

18. A cupola furnace comprising:
a shell defining a cavity therein;
a charge disposed within the cavity and including:
a metal feedstock;
a flux material; and
a mixture including anthracite coal and coke;
a windbox configured for collecting a blast air;
a plurality of tuyeres each extending through the shell and configured for introducing the blast air into the cavity at a blast air flow rate;
at least one burner disposed within a first one of the plurality of tuyeres and configured for simultaneously injecting:
a first quantity of oxygen gas into the cavity at a first oxygen gas flow rate; and natural gas into the cavity at a natural gas flow rate;
at least one lance disposed within a second one of the plurality of tuyeres and configured for driving a second quantity of oxygen gas into the cavity at a supersonic oxygen gas flow rate that is greater than the first oxygen gas flow rate;
a stack gas including a plurality of combustion products;
a stack gas analyzer apparatus configured for measuring an amount of the plurality of combustion products present in the stack gas; and
a melted cast iron, ductile base iron or gray iron material removable from the cavity.

19. The cupola furnace of claim 18, further including:
a third one of the plurality of tuyeres, wherein the second one of the plurality of tuyeres is spaced apart from and disposed between the first one of the plurality of tuyeres and the third one of the plurality of tuyeres; and
a second burner disposed within the third one of the plurality of tuyeres.

20. The cupola furnace of claim 18, wherein the shell has a proximal end and a distal end spaced apart from the proximal end and further defines an opening configured for inserting the charge into the cavity, and further wherein the stack gas analyzer apparatus extends along the shell within the cavity and is disposed between the opening and the proximal end.

21. The method of claim 4, wherein reduced carbon monoxide gas emissions are released from the shaft furnace into an environment.

22. The method of claim 17, wherein reduced sulfur dioxide gas emissions are released from the shaft furnace into an environment.

23. The method of claim 1, wherein the metal feedstock comprises pig iron.

24. The cupola of claim 18, wherein the metal feedstock comprises pig iron.

* * * * *